Dec. 8, 1959

G. B. CRANE

2,916,735

MEANS AND TECHNIQUES FOR PRODUCING INSTANTANEOUS
DIRECTION FINDING INFORMATION PLAN
POSITION INDICATOR

Filed Feb. 24, 1953

INVENTOR.
GEORGE B. CRANE
BY
*Lyon & Lyon*
ATTORNEYS

Dec. 8, 1959  G. B. CRANE  2,916,735
MEANS AND TECHNIQUES FOR PRODUCING INSTANTANEOUS
DIRECTION FINDING INFORMATION PLAN
POSITION INDICATOR
Filed Feb. 24, 1953  7 Sheets-Sheet 3

FIG. 3B

INVENTOR.
GEORGE B. CRANE
BY
Lyon & Lyon
ATTORNEYS

INVENTOR.
GEORGE B. CRANE

United States Patent Office 2,916,735
Patented Dec. 8, 1959

2,916,735

MEANS AND TECHNIQUES FOR PRODUCING INSTANTANEOUS DIRECTION FINDING INFORMATION PLAN POSITION INDICATOR

George B. Crane, Redondo Beach, Calif., assignor to Gilfillan Bros., Inc., Los Angeles, Calif., a corporation of California Application February 24, 1953, Serial No. 338,371

3 Claims. (Cl. 343—6)

The present invention relates to means and techniques which may be used in conjunction with a plan position indicator (P.P.I.) for developing a strobe which extends from the polar origin of the indicator display through an indication of the aircraft with which communication is established so that a particular one of a plurality of aircraft on the P.P.I. display may be identified. Thus, more generally, the present invention relates to means and techniques for indicating the instantaneous direction of an aircraft.

Plan position indicators, as is well known in the art, develop a display of an area scanned by an antenna while continuously rotating through 360 degrees. In the display, the range marks are circles, and echo signals derived from aircraft within, for example, 30 miles from the situs of the P.P.I. installation appear as visible indications on a circular screen of a cathode ray tube. In a ground controlled approach (GCA) landing system the P.P.I. constitutes the "Search" portion of the installation. In other words, an aircraft is first located using the search or P.P.I. equipment and then communication is established with the aircraft so that proper landing instructions may be given to the pilot of the aircraft. In a system of this character, however, there may be indications from a coresponding plurality of aircraft, and some difficulty may be encountered in ascertaining that particular aircraft with which communication is established, i.e., which aircraft is transmitting verbal information over an associated communications radio channel.

In accordance with the present invention, the difficulty mentioned in the preceding paragraph is obviated using means and techniques disclosed herein whereby that particular aircraft with which communication is established may be quickly ascertained by generation of a strobe on the face of the cathode ray tube, such strobe, as mentioned previously, extending from the geometrical center of the P.P.I. display through the aircraft indication on the cathode ray screen.

It is therefore an object of the present invention to provide means and techniques for obviating the above-mentioned difficulties and for producing the aforementioned results.

A specific object of the present invention is to provide means and techniques whereby these results may be obtained using only those beam deflecting means which are normally associated with a P.P.I. indicator.

Another specific object of the present invention is to provide means and techniques whereby a clear presentation of the stroke is made, taking into account the fact that there are produced relatively high transients when the strobe generating means are placed in operation and subsequently disabled.

Another specific object of the present invention relates to means and techniques which assure a substantially straight line strobe instead of a curved strobe which may lead to confusion and inaccuracy.

Another specific object of the present invention is to provide a direction finding system which is designed to instantly locate or identify aircraft communicating with a P.P.I. radar installation on a communication channel.

Another specific object of the present invention is to provide a system of this character which normally does not interfere with the normal P.P.I. presentation but which, when switching means are operated, produces an overriding control effect serving to modify the normal functioning of the P.P.I. equipment.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 7 is a schematic diagram of the video amplifier showing in detail the manner in which the video range marks intensifying gates are mixed and applied to the cathode ray tube.

Figure 1:
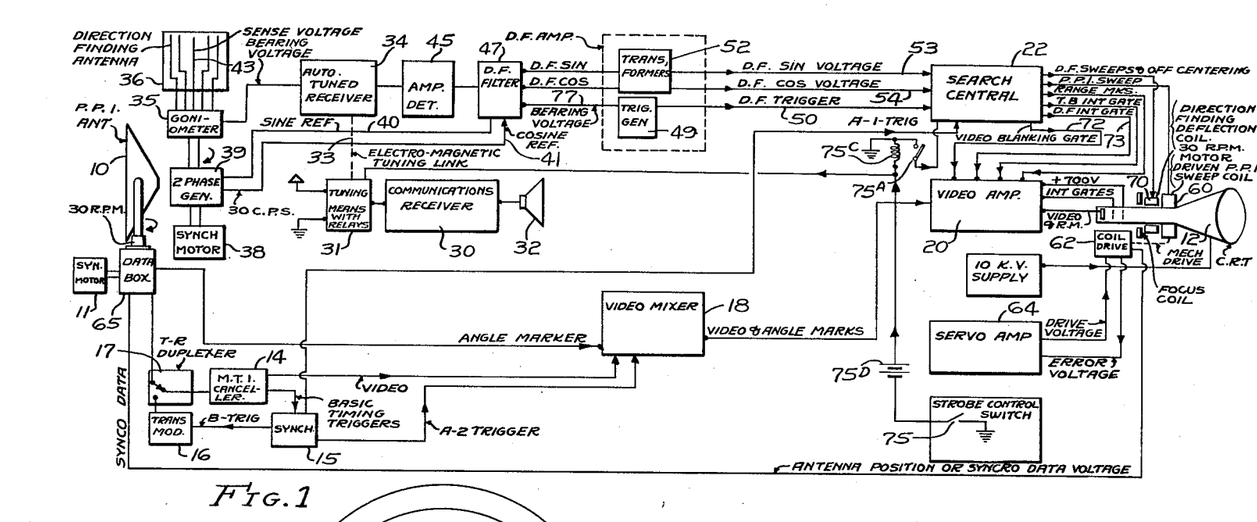
Figure 1 shows generally in block diagram form a system embodying features of the present invention.
Figure 2:
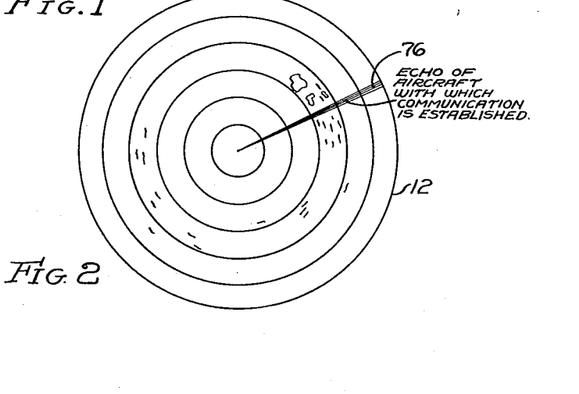
Figure 2 shows a type of display of a cathode ray tube produced using the arrangement shown in Fig. 1.

Referring to the block diagram of the system shown in Figure 1, there is shown a conventional P.P.I. antenna 10 which is rotated continuously through 360 degrees by a synchronous motor 11 for normally developing a P.P.I. indication on the cathode ray tube 12 in which, as shown in Figure 2, the range marks constitute circles. The system incorporates a so-called moving target indicator (M.T.I.) canceller 14 which supplies basic timing triggers to the synchronizer 15. The trigger of the synchronizer 15, in the form of a so-called "B" trigger, is applied to the transmitter modulator stage 16, the output of which is applied to the antenna 10 through the conventional transmit-receive (TR) duplexer 17. The synchronizer unit 15 supplies a so-called A2 trigger to the video mixer 18 as well as an A1 trigger to search central unit 22 for triggering apparatus in the search central unit 22, as described in detail hereinafter, for producing conventional P.P.I. sweeps, range marks, and time base (T.B.) intensity gates. The P.P.I. sweep currents are applied to the rotating conventional P.P.I. coil 60 which is rotated synchronously with the antenna at approximately 30 r.p.m. The range marks are applied to the video amplifier 20 wherein they are mixed with video and applied to the cathode of cathode ray tube 12. The time base intensity gates are likewise applied to the so-called video amplifier 20 and subsequently applied to the first control electrode of the cathode day tube for conventional unblanking between P.P.I. sweeps, The P.P.I. coil 60 is driven by the driving motor 62 which is conventional and supplied in conventional manenr with the designated information from the servo amplifier 64 and data box 65.

Resulting echo signals from targets such as aircraft within the range of the P.P.I. indicator are received on the antenna 10 and transferred through the TR duplexer 17 and M.T.I. canceller 14 to the video mixer 18. Also applied to the video mixer 18 are conventional angle markers which serve to indicate the angular position of the antenna beam. The combined video and angle marks are applied to the video amplifier 20 and then to the cathode of the cathode ray tube 12. As described hereinafter, the video amplifier 20 includes mixing means for mixing range marks developed in the search central unit 22 with the video before application to the cathode of tube 12.

The system also includes a communications transmitter-receiver unit on each aircraft and a communications transmitter-receiver at the situs of the P.P.I. installation so that the radar personnel located on the ground may communicate with the pilot of an incoming aircraft. Transmitter-receivers of this character operating, for example, in the range of 9 megacycles are conventional, and the drawings do not go into detail with respect to the same. Further, in accordance with one of the features of the present invention, the ground based communications receiver 30, having tuning means 31 and speaker 32, is mechanically interlinked through the tuning link 33 with the direction finder-receiver 34. Thus, the receiver 34 is always tuned to the same frequency to which the tuning means 31 is adjusted, and this is done automatically upon adjustment of the tuning means 31. The automatically tuned receiver 34 has its input terminal connected to the goniometer 35 for selecting and amplifying a so-called bearing voltage developed under rotation of the direction finding antenna 36. Also driven by the synchronous motor 38 is a two-phase generator 39 which produces two sine waves displaced 90 degrees with respect to each other, one of such voltages being applied to lead 40 and being termed the "sine reference" voltage, while the other voltage appearing on lead 41 is designated the "cosine reference" voltage. These two voltages appearing on leads 40, 41 have a periodicity of 30 c.p.s, i.e., these two voltages have the same cyclic variation as the antenna 10 which rotates at 30 r.p.m. and the direction finding antenna 36 which also rotates at 30 r.p.m. Direction finding antennae of the character shown at 36 are considered to be well understood in the art, and the one used in this particular instance has the following U.S. Government designation: AN/GRA-7. In general, the direction finding antenna system comprises a group of antennae including an antenna unit 43 for developing a so-called sense voltage. This direction finding antenna system incorporates a means for lobe switching between antennae and sensing simultaneously. Through lobe switching and sensing, the direction receiving antenna electrically scans through 360 degrees in azimuth 30 times per second; and, the two sine waves appearing on leads 40, 41 define the bearing of the direction finding lobe at any instant in time. It is clear that the voltage applied to the input of the receiver 34 varies as the antenna is rotated. This variation is amplified and detected in the amplifier detector stage 45 before being applied to the direction finder filter unit 47. This detected bearing voltage appearing on the output of the filter 47 is applied to a trigger generator stage 49 for developing a so-called direction finder trigger which is applied to lead 50. The sine and cosine reference voltages are also applied to the direction finder filter unit 47 and then to transformers 52 for stepping up their voltages before application to the leads 53, 54. This direction finding data, i.e. the sine reference voltage, cosine reference voltage and trigger, are applied to the search central unit 22 and, in conjunction with other circuitry in such central unit 22 actuated by the A1 trigger, develop strobes which are applied to the direction finding deflection coil 70. This coil 70 is also referred to herein as the "off-centering" coil in that it performs certain useful functions also in the normal P.P.I. operation of the equipment, i.e. it facilitates the generation of P.P.I. sweeps from a polar origin which is capable of being shifted a substantial distance from the geometrical center of the CRT. Also as a result of the direction finding data, there is produced a so-called video unblanking gate and direction finding (DF) intensity gate which appear respectively on leads 72 and 73 and which are applied to the video amplifier 20 for producing a desirable unblanking, as described in detail hereinafter.

As indicated above, the system shown in Figure 1 operates as the conventional P.P.I. and produces a conventional P.P.I. display, but upon operation of the strobe control switch 75, the direction finding trigger appearing on lead 50 is rendered effective to produce an overriding control effect and to produce a plurality of strobes (which, for all intents and purposes, may be considered to be one strobe) 76 (Fig. 2) which extends from the geometrical center of the display to the outer edge of the display. Another feature of the present invention is that the strobe 76 is produced without curvature in the same.

Figure 3A:
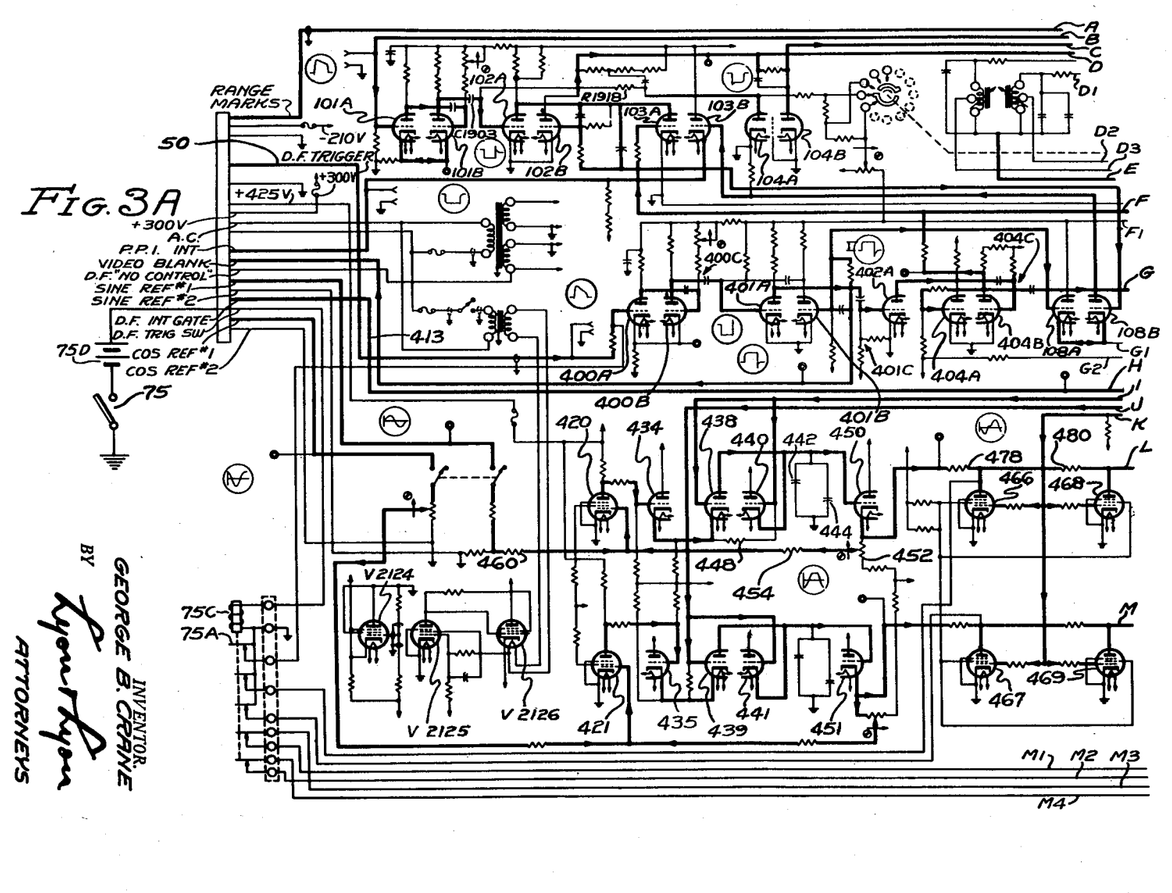
Figure 3 comprising Figures 3A and 3B on separate drawing sheets is a schematic diagram of the so-called "search central" unit which is referred to as such in block diagram form in Figure 1; it is understood that for this purpose those terminals in Figures 3A and 3B having the same reference letters are connected together.
Figure 3B:
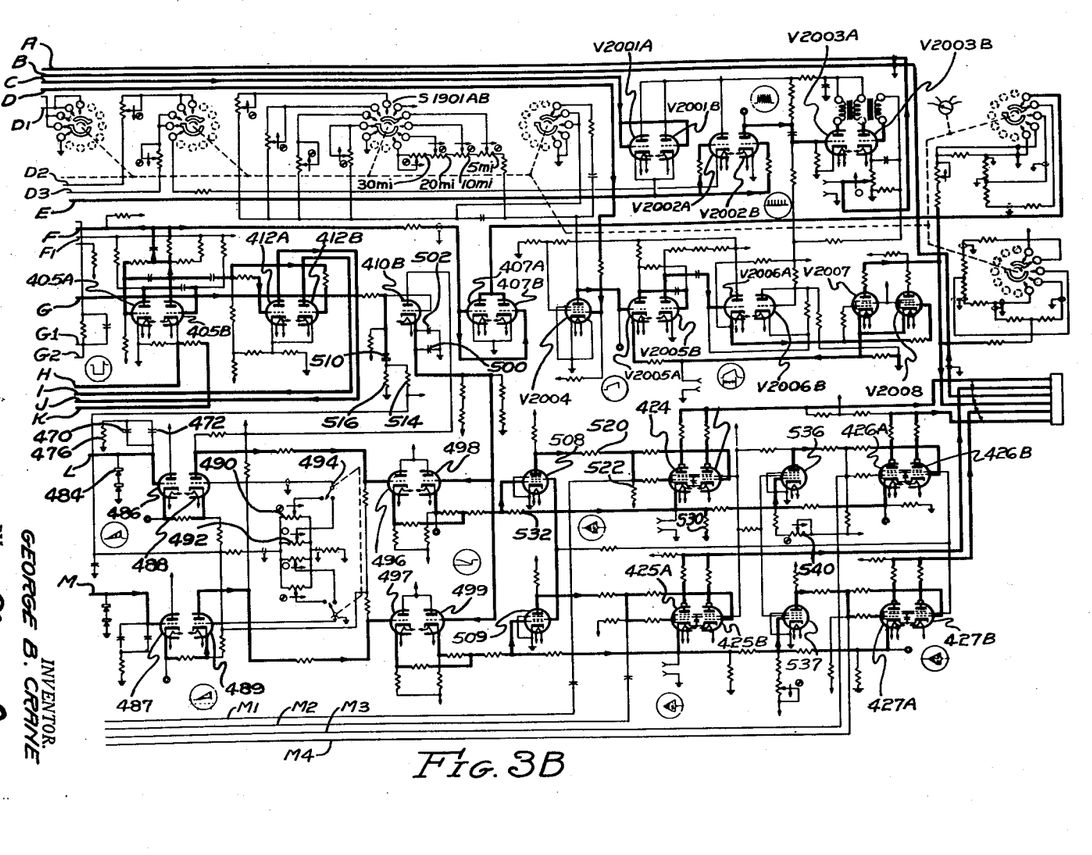

*Normal operation of P.P.I. (Figures 1, 3 and 6)*

Figure 6:
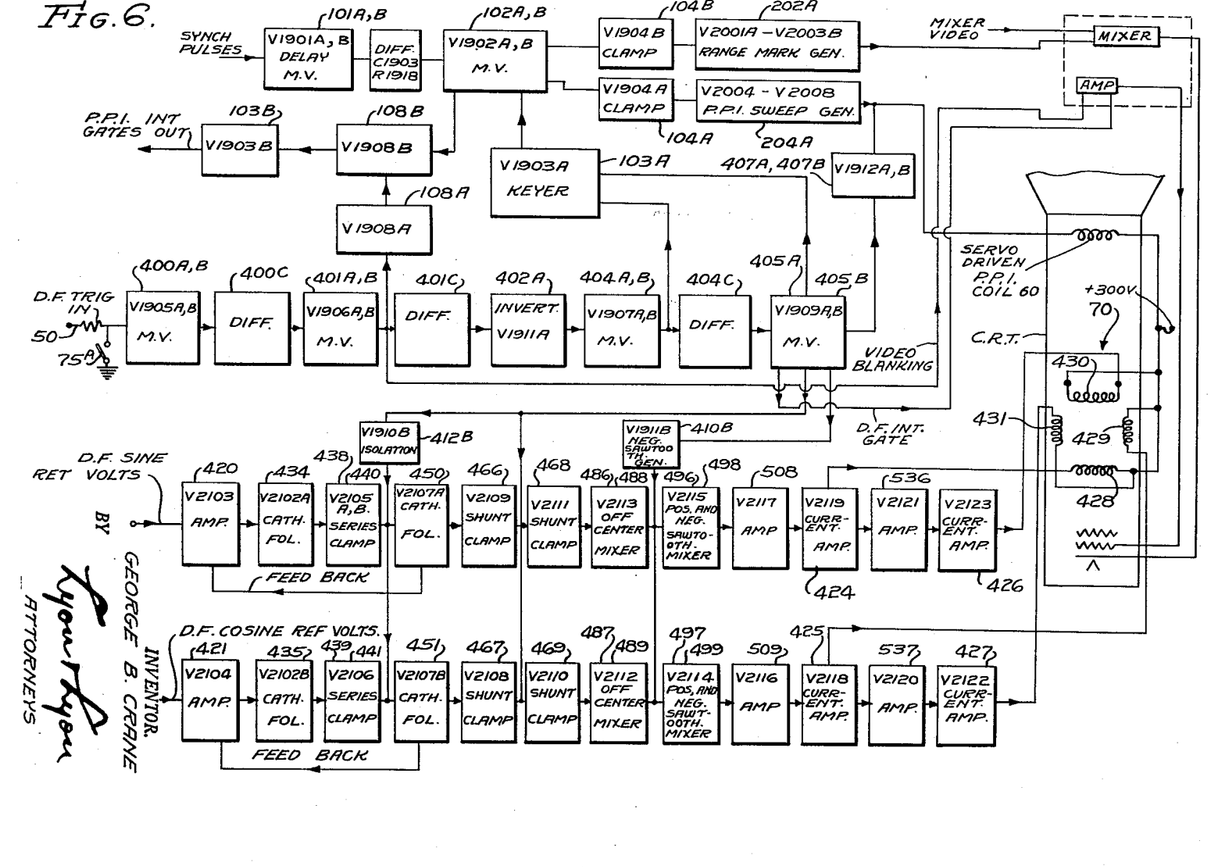
Figure 6 is a block diagram of a so-called search central unit which is illustrated in schematic form in Figure 3 and which is indicated as such in Fig. 1, with the stationary off-centering and rotating P.P.I. beam deflecting coils connected to components of the search central unit.

For purposes of developing the conventional P.P.I. display, the search central unit 22 requires supplied thereto only the A1 trigger from synchronizer 15. Application of the A1 trigger to the search central unit 22 results in (1) formation of peaks for intensifying the P.P.I. sweeps, for indication of range marks and for indication of normal P.P.I. and sweep voltages; (2) generation of range marks; (3) generation of sweep voltages; and (4) generation of D.C. off-centering voltages. The search central unit 22 serves two additional functions which are described hereinafter in detail, but are mentioned here briefly. These two functions are: (1) formation of gates to blank the P.P.I. and the P.P.I. gates during the direction finding operating periods, to intensify the P.P.I. for the duration of the DF strobe, and to establish sweep voltages for the DF sweep periods; and (2) generation of DF sweep voltages. Only the functions associated with the normal P.P.I. display are described under this heading since their operation is independent of the DF circuits.

The A1 trigger is applied to the grid of tube 101A. This tube is the first half of a cathode-coupled multivibrator which is biased to be cut off by the normally conducting second half or tube 101B. The A1 trigger thus causes a positive gate to be formed at the anode of tube 101B. This delay gate is differentiated by capacitor C1903 and resistance R1918 and its trailing edge is used to trigger the P.P.I. gate multivibrator tube 102A, B. The tube 102A, B is a plate-coupled multivibrator in which the first half, i.e. 102A, normally conducts while the second half, 102B, is normally cut off due to the high negative potential applied to its grid. The negative gate formed at the anode of tube 102B varies between 125 microseconds and 500 microseconds, approximately.

Figure 5:
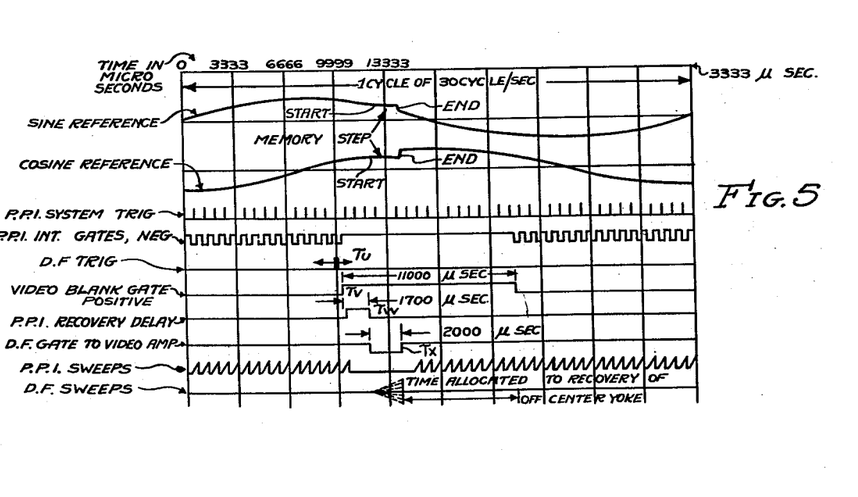
Figure 5 serves to illustrate different wave forms of voltages and currents in the composite system.

The positive gate formed on the anode of tube 102A is coupled to the grid of tube 108B. The gate is then inverted and sent to the cathode follower tube 103B. This gate is used to intensify the cathode ray tube electron beam during each sweep interval. Tube 108A receives the positive video blanking gate from the DF video blanking multivibrator 401A, 401B when the direction finding strobe switch 75 (Fig. 3a) is closed and the relay switch 75A (Fig. 6) is thus opened. This, as described in detail hereinafter, causes the commonly-coupled cathodes of tubes 108A and 108B to become more positive, effectively creating a negative bias on the grid of tube 108B. This bias cuts off the gates for a period of approximately 11,000 microseconds while the DF circuits are operating. The gate switching tube or keyer 103A receives a positive P.P.I. recovery-delay and DF sweep gate from the DF gating circuit during the interval between the beginning of the DF video blanking gate and the end of the DF sweep period, as shown in Figure 5. This action removes sweep voltages and range marks from the P.P.I. presentation on the indicator for the DF period by stopping the formation of the P.P.I. gates.

The P.P.I. gate is forwarded to the range mark circuit for use as a time base in the formation of range marks. The range mark generator circuitry is conventional and per se forms no part of the present invention, so that a detailed description of the same is not given here. In developing the P.P.I. sweeps the negative P.P.I. gate from the anode of tube 102B is also sent to the anode of the sweep clamper tube 104A. This tube normally draws heavy current sufficient to saturate this plate circuit. When the negative gate is applied the plate current is cut off to form a rising sweep voltage in the P.P.I. sweep generator. Here again, the sweep generator, which is designated by the numeral 204A in Figure 6 forms per se no part of the present invention and, for that reason, a detailed description of the same is considered unnecessary. Means are present in the sweep generator for developing sweeps of different lengths depending upon the range desired. For this purpose, P.P.I. gate lengths for the 5-mile, 10-mile and 20-mile sweeps are made twice the length required to deflect the sweeps through those intervals, in order to provide longer sweeps which would extend to almost the full diameter of the tube face when off-centering is used. Thus, when off-centered to the edge of the display using the off-centering coil 70, the 5-mile range becomes 10 miles, the 10-mile range becomes 20 miles, and the 20-mile range becomes 40 miles. The 30-mile sweep is cut off at 40 miles and extends across two-thirds the diameter of the cathode ray tube when it is fully off-centered.

Because of the proximity of the off-centering coil yoke 70, magnetic flux induced into it from the P.P.I. deflection coil 60 does not completely decay during the recovery time of each sweep. Unless corrected, this would prevent the return of the spot to the desired point on the face of the cathode ray tube in time for the start of the next P.P.I. sweep. This would result in the next sweep starting at some point away from the center of the display, creating a center blank spot which would change in size depending on the sweep length in use. To correct for this condition, a reverse direct current is established in the deflection coil 60 which compensates for the magnetic lag produced by the inductance of the off-centering coil. An uncompensated reverse current would cause each succeeding sweep to start at a point beyond the center of the display, and result in sweep overlap. This condition is corrected by adjusting the length of the sweep gate to the degree needed to make the time at which the beam crosses the center point of the display coincident with the time the sweep starts. Proper adjustment of the compensating direct current and the length of the gate results in removal of the center blank areas on all ranges.

As is described in detail hereinafter, the P.P.I. sweep is removed from the rotating coil 60 when it becomes necessary to introduce the DF sweep through the off-centering coils 70. The added current introduced into the rotating coil 60 would normally oppose beam-centering. To compensate for this, a subtractive current is interposed in the circuit.

The off-centering circuit has two functions. One function is the production of centering and off-centering voltages and the other is the amplification of DF sweep voltages. In both cases, the circuit feeds the off-centering coil 70 which consists of four separate inductances, as shown in Figure 6. During normal P.P.I. sweep action, D.C. voltages are applied to the off-centering coils for the purpose of returning the electron beam to the exact center of the screen during the interval between sweeps. The off-centering coils also perform the functions necessary to deflect the origin of the sweep from the center of the cathode ray tube to any other point on the screen, as desired by the operator. Two circuits are utilized to prepare these voltages. One circuit is used for vertical deflection, and the other circuit is used for horizontal deflection. When switch 494 (Fig. 3B) is in its upper closed or the centered position, potentiometer 490 provides a controllable D.C. voltage at the grid of tube 488. Tube 488 furnishes a steady plate potential to the grid of the cathode follower tube 496. Tube 498, with its cathode and anode connected in parallel with the cathode and anode of tube 2115A, may be neglected in the consideration of the off-centering circuit since, during normal P.P.I. presentation, its grid receives an unchanging potential from the cathode of tube 410B. When switch 494 is in its lower closed position or the off-centered position, the potentiometer resistance 492 provides a controllable D.C. voltage at the grid of tube 488. This control enables moving the spot vertically to any point on the screen by varying the voltage applied to the grid of tube 488.

*Generation of direction finding trigger (Figures 1 and 4)*

Figure 4:
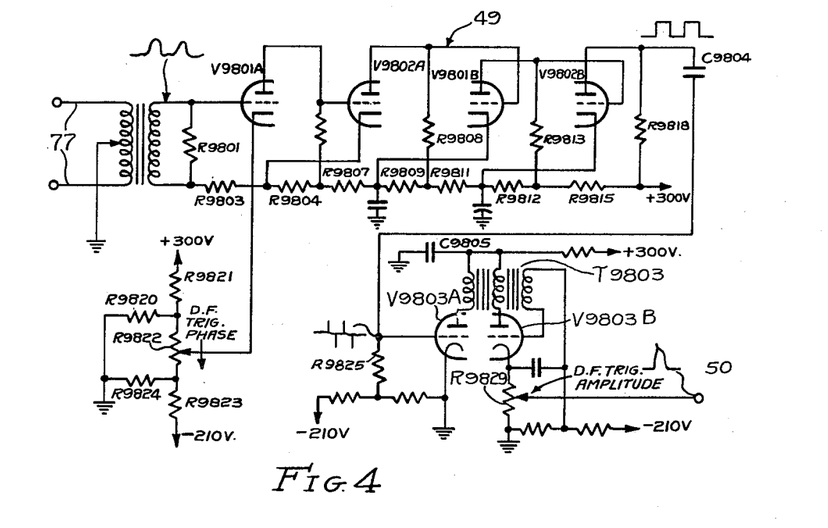
Figure 4 is a schematic diagram of the so-called direction finder trigger generator which is located in the so-called "direction finder amplifier" illustrated in block diagram form in Figure 1.

The function of the trigger generator 49 is to develop the direction finding trigger from the bearing voltage which varies at a cyclical rate, i.e., at 30 cycles per second. It is understood, of course, that the appearance of the maximum amplitude of the cyclically varying bearing voltage is definitely related to the azimuthal position of the aircraft from which signals are being received. One feature of the trigger generator 49, as presently described, is that a trigger voltage is likewise developed, the appearance of which is likewise definitely related to the azimuthal position of the aircraft. The DF bearing signal having a root mean square amplitude of, for example, 8 volts is applied to the grid of tube V-9801A. The cathode of this tube has a bias value dependent upon the setting of the so-called DF trigger phase potentiometer R-9822. The bias which may be either positive or negative is set to a level that would cause the tube to conduct on the positive slope of the input wave at the negative-to-positive crossover point. This point is important because it remains constant irrespective of amplitude variations in the signals received by the direction finding antennae. With potentiometer resistance R-9822 properly adjusted, there is a minimum change in the point on the positive slope at which the trigger is generated. The amplifying circuit following the first tube V-9801A consists of a series of direct-coupled overdriven amplifier stages which amplify the received signal and distort it to a square shape. The four amplifying stages operate at successively higher voltage levels established by the potential drops across a voltage divider network. A potential of +300 volts is applied across this network which consists of resistors R-9803, R-9804, R-9807, R-9809, R-9811, R-9812, R-9815. Quiescent voltages for each of the four D.C. amplifiers V-9801A, V-9802A, V-9801B and V-9802B are established by these resistors. The square wave appearing at the anode of tube V-9802B is differentiated by capacitor C-9804 and resistor R-9825, and its leading edge is used to trigger the normally cut off buffer amplifier tube V-9803A. The buffer amplifier feeds a negative pulse to the blocking oscillator transformer T-9803 and triggers the blocking oscillator tube V-9803B. The positive DF trigger appearing on the cathode of tube V-9803B is fed through the amplitude adjusting resistor R-9829 to the search central direction finding circuitry, as described hereinafter.

Direction finding (DF) system (Figures 1, 3 and 6)

As mentioned previously, the DF system provides an intensified sweep, or strobe, on the search indicator which indicates the azimuth bearing of the aircraft with which an operator is in communication. Voice transmission from the aircraft is received simultaneously by the communication receiver 30 and the DF equipment receiver 34. The DF equipment uses this received transmission for azimuth bearing information, enabling circuits in the radar set to develop a strobe 76 (Fig. 2). The strobe 76 appears on the search indicator tube 12, and intersects the aircraft echo on the P.P.I. display.

The prime source of DF information is the direction finder group which includes the antennae 36, 43, goniometer 35, two-phase generator 39, and synchronous motor 38. Since this equipment is known and, per se, forms no part of the present invention, only a brief summary of the operation of this equipment is included here. The input to this DF equipment is included here. The input to this DF equipment is the radio-frequency signal transmitted from an aircraft which may have a carrier frequency of, for example, 9 megacycles. The output from the DF equipment consists of the sine and cosine reference voltages (sinusoidal voltages 90 electrical degrees apart) appearing on leads 40 and 41, respectively, and the bearing signal which is applied to receiver 34. Reference voltages are routed to the DF amplifier which includes elements 49 and 52 and are then routed to the search central unit 22. The search central unit 22 utilizes the reference voltages to enable the generation of sweeps at the proper azimuth bearing. The bearing signal has a phase, relative to the reference voltages, determined by the direction of the aircraft. The DF amplifier utilizes the bearing signal to form a trigger in trigger generator 49, as described previously, at the time representing the direction of the aircraft. This DF trigger is sent to the search central unit 22 to initiate the DF strobe.

An autotune mechanism represented by the line 33 automatically tunes each of the DF receivers. When the direction finding strobe switch 75 is closed, the voltage of source 75D is applied to the control relay winding 75C and also to relay controlled circuitry in the unit 31 to energize the electromagnetic tuning link 33 which extends between the units 31 and 34 so that the receiver 34 is tuned to the same frequency to which the unit 31 is tuned. After the autotune mechanism has tuned the DF receiver 34, sine and cosine reference voltages and the bearing signal appear at the DF amplifier 49, 52.

The DF amplifier receives the sine and cosine reference voltages and the bearing signal from the filter unit 47. The sine and cosine voltages are raised from 8 to 25 volts, separated into individual channels, and sent out to the search central unit 22. A D.C. amplifier and trigger generating circuit 49 in the DF amplifier receives the bearing signal and forms a trigger at the same point on each cycle of the 30-cycle signal. This trigger is also routed to the search central unit 22.

Since switch 75 may be depressed whenever a DF bearing is desired, there is no correlation between the timing of the normal P.P.I. sweep circuits and the occurrence of a DF trigger. The DF trigger appears at any time within one-thirtieth of a second after the DF strobe switch 75 is operated, provided that the DF receiver 34 has been previously tuned to the correct frequency for reception. Time relationships in the DF circuits are fixed relative to the time of occurrence of the DF trigger. Since the DF information bears no definite time relationship to the regularly occurring P.P.I. sweeps, provision is made to cause this DF information to override and replace the normal P.P.I. sweeps.

An initial time delay (adjustable from 150 microseconds to 1150 microseconds) occurs immediately after the DF trigger, and this time delay is represented in Figure 5 by the horizontal distance between $T_u$ and $T_v$, and permits the strobe in the display to be accurately aligned to bisect the echo image of the aircraft with which communication is established. Following this delay, at time $T_v$, a long video blanking gate (11,000 microseconds) is initiated which interrupts video in the video amplifier and also the P.P.I. intensity gate being applied to the cathode ray tube (CRT). The entire sequence of DF events in the sweep circuits takes place during this period of normal P.P.I. function interruption. At this same time, $T_v$, a 1700-microsecond gate is initiated (P.P.I. recovery gate) which turns off the P.P.I. sweep circuits and stops the action of the sweep currents in the P.P.I. deflection coil 60, allowing this coil 60 and the off-centering coils 70 to reach a quiescent condition. The off-centering coils 70 carry the DF sweep deflection current, and are, in practice, located directly around the P.P.I. deflection coil 60. There is a considerale amount of magnetic coupling between the two coils, 60, 70. The P.P.I. recovery gate permits the P.P.I. sweep coil and the off-centering deflection coil fields to collapse completely before the DF sweep or gate is begun at time $T_w$. The DF sweep circuits are actuated by the 2000-microsecond DF sweep gate. This gate also replaces the P.P.I. recovery delay gate and continues to interrupt the normal P.P.I. sweep action. The P.P.I. recovery delay and DF sweep gates, in sequence, also interrupt the action of the reverse centering current in the deflection coil 60. The normal function of this reverse centering current in coil 60 is explained above. At the end of the DF sweep gate, time $T_x$, normal P.P.I. deflection currents begin, but the CRT intensity gate and video signals do not begin until approximately 8000 microseconds after time $T_x$ since the video blanking gate exists. During this period, off-centering coil currents in coil 60 reach a normal condition, and their transient effects on the P.P.I. deflection coil cannot be seen. At the end of the video blanking gate, normal CRT intensity returns and video signals appear. The P.P.I. recovery delay and DF calibrate gates both occur before the DF strobe, and introduce a lag which is compensated for by positioning the goniometer stator coils in goniometer 35 (Fig. 1).

Referring specifically to Figures 3 and 6, the DF trigger appearing on lead 50 is applied to the grid of delay multivibrator tube 400A. This trigger is applied immediately after the DF strobe switch 75 is placed in the "On" or "Momentary On" position (time $T_u$, Fig. 5). Tube 400A is normally biased below cutoff by the effect of the heavy current drawn by the cathode of delay multivibrator tube 400B. The positive trigger appearing on the grid of tube 400A creates a negative gate on its plate. The length of the gate is normally adjusted to position the DF strobe 76 (Fig. 2) appearing on the P.P.I. display to present an accurate indication of direction. The positive gate at the plate of tube 400B is differentiated by differentiating network 400C which is conventional and includes a capacitor and resistor; and, a negative-going pulse occurs at the end of the gate at time $T_v$. The following plate-coupled multivibrator tube 401A, B, generates the positive 11,000-microsecond video blanking gate. Tube 401A which is normally conducting is cut off by the negative pulse from tube 400B. This forms a positive gate on its plate. The gate is applied to the grid of tube 402A through differentiating network 401C, which is part of the P.P.I. recovery gate circuit, and to the video amplifier (Fig. 7) where it prevents search video signals from being rendered visible on the CRT. At reduced amplitude, this gate is applied from the grid of tube 401B to the grid of tube 108A, where it turns off the P.P.I. intensity gate. Tube 108A normally does not conduct until the positive gate is applied. When the gate is applied, the cathode voltage rises and the commonly-coupled cathode of tube 108B also rises. This increases the bias of tube 108B to a point below the minimum cutoff value needed to produce the P.P.I. intensity gate, and removes all the P.P.I. intensity gates for the period of DF presentation.

The leading edge of the video blanking gate is differentiated in stage 401C which includes a capacitor and a resistor and is sent to the grid of trigger inverter tube 402A. Tube 402A forms a negative trigger on its plate coincident with the positive pulse or spike occurring at the start of the video blanking gate at time $T_v$. This negative trigger initiates the action of the multivibrator circuit comprising tubes 404A and 404B. A 1700-microsecond positive gate is formed at the plate of tube 404B between time $T_v$ and time $T_w$. The purpose of this gate is to provide recovery time for the P.P.I. deflection coil between the time of interruption of the P.P.I. sweeps and the time of starting the DF deflection sweeps.

The trailing edge of the positive gate from the anode of tube 404B is differentiated in a network 404C which includes a capacitor and a resistor. Tubes 405A and 405B form a multivibrator circuit for the generation of the DF sweep gate. The negative pulse or spike, occurring at the trailing edge of the positive P.P.I. recovery delay gate, is applied to the grid of tube 405A and cuts the tube off, causing a positive gate to appear on its plate. The gate length is approximately 2000 microseconds (from time $T_w$ to time $T_x$), determined by the values of a capacitor and a resistor. The positive gate from the plate of tube 405B is combined with the P.P.I. recovery delay gate (time $T_v$ to time $T_w$) and inverted in switch or keyer tube 103A. The resulting negative gate on the plate of multivibrator tube 102A cuts the P.P.I. gate off and stops action in the range mark and P.P.I. sweep generator circuits for the period between time $T_v$ and time $T_x$. This gate, from time $T_v$ to time $T_x$, is also sent to the grid of tube 407A to nullify the flow of reverse current in the P.P.I. deflection coil. The negative DF sweep gate from the plate of tube 405A is applied to the grid of negative sawtooth generator tube 410B, in the DF sweep circuit. The positive DF sweep gate from the plate of tube 405B is applied to the grid of tube 412B to actuate the series of clamp tubes in the DF sweep circuits. The negative gate appearing on the cathode of tube 405B is applied to the lead 413 which is connected to the search video amplifier to intensify the CRT during the DF sweep interval. This same gate, coupled through a resistor, is applied to the DF sweep clamp tubes to generate positive sawtooth voltages. The sine and cosine reference voltages are applied to the sine and cosine reference voltage amplifier tubes 420 and 421, respectively. These are the input tubes to two identical D.C. amplifier circuits. Since the circuits are identical, only the sine channel is discussed in detail. For purposes of identifying corresponding elements in the cosine channel, such elements in the cosine channel are assigned odd-numbered numerals, each of which is one higher than the reference numeral assigned to the corresponding element in the sine channel.

In general, the DF strobe, which can radiate from its starting point on the display in any azimuth direction, is formed in the off-centering coils 70 as the vector summation of two deflecting vector forces 90 degrees apart. These vector forces have magnitudes dependent on the instantaneous voltage levels of the sine reference and cosine reference voltage inputs at the time the DF sweep gate begins. A strobe in the horizontal direction will occur when the sine reference input voltage is zero and the cosine reference input voltage has a maximum positive or a maximum negative value (a direction indication of 90 degrees or 270 degrees). A strobe in the vertical direction will occur when the cosine reference input voltage is zero and the sine reference input voltage has a maximum positive or maximum negative value (a direction indication of zero degree or 180 degrees). Intermediate angular positions depend on the time of occurrence of the DF trigger, which in turn is dependent on the azimuth position of the aircraft from which a transmission is received.

The deflection force caused by the sine reference voltage reverses polarity at the horizontal axis, while that caused by the cosine reference voltage reverses polarity at the vertical axis. This reversal is accomplished by establishing a starting (quiescent) value of current through the coils 70 and through the sweep current tubes (424 and 426 for the sine sweep). Therefore, the tubes 424, 426 operate as class A amplifiers. Two tubes are used for each axial force, one tube to control the current flow in each half of the coils 428, 430, respectively. In one coil, the current increases, while in the other coil it decreases. The push-pull action reverses for a reversal of deflection force. The sawtooth sweep voltage on the grids of the sweep current tubes must reverse polarity also. This is accomplished by generating a fixed negative sawtooth to which is added a positive sawtooth. The positive sawtooth has an amplitude proportional to the voltage level of the input reference voltage at the beginning of the DF sweep gate (time $T_w$). At the amplifier inputs, the average voltage level of the sine reference and cosine reference voltage is at ground potential. This average voltage level is raised to a positive value before the positive sawtooth is generated, to assure that during the negative half-cycles the sweep voltage is always positive-going.

The large inductance of the off-centering coil 70 permits only a relatively slow sweep to be generated which requires a long period of time. The sweep gate length is adjusted to 2000 microseconds for this reason. During this time (2000 microseconds), the DF antenna pattern rotates, at 30 c.p.s., through an arc of approximately 20 degrees. This is also the angular duration of the sine reference and cosine reference voltage inputs to the sweep amplifier. If the positive-going sweep voltages were continually proportional to the amplitude of the changing input voltages during this 20-degree interval, a curved sweep or strobe would result. To avoid this curved sweep or strobe, the instantaneous values of the sine reference and cosine reference voltages at the start of the sweep gate are "remembered" for the duration of the DF sweep gate. A constant charging voltage is thus present at the sweep voltage generator, and because of this constant voltage, straight sweeps are produced.

The 30-cycle sinusoidal waveform after amplification in amplifier tube 420 is applied to grid of the cathode follower tube 434. The output of this tube directly couples the sine voltage to the cathode of tube 438, which is the first half of the series clamper which also includes tube 440. In this stage, tubes 438 and 440 are connected in series, with the plate of tube 440 conected to $+300$ volts. The grids are paralleled and coupled to the output of sweep gate inverter tube 412B. In the absence of a sweep gate, tube 412B is cut off and the clamper stage is at zero bias. The voltage at the cathode of tube 438, and thus the voltage across capacitors 442 and 444, follows the inverted sine reference input closely. At the instant the sweep gate appears (a positive gate at the grid and a negative gate at the plate of tube 412B), a negative voltage which is developed across resistance 448 cuts off the clamper tube 438, 440, and the voltage across capacitor 442 is held constant for the duration of the gate, since there is no discharge path. In this manner, a "memory step" is superimposed on the sinusoidal waveform (see Figure 5). At the end of the gate, tube 438, 440 again conducts and capacitors 442 and 444 rapidly charge to a value corresponding to the inverted sinusoidal input voltage. The average value of sine reference voltage is shifted in a positive direction by cathode follower tube 450. The amount of shift is determined by the adjustment of "Sin Zero Set" potentiometer 452, so that the negative half-cycle of the sinusoid will be above zero volt, and so that the cathode voltage will maintain the correct value when the sine reference voltage is absent. The feedback path, from potentiometer 452 through resistor 454 to the grid of tube 420, causes the voltage developed across resistor 454 to be equal to the voltage across resistor 460. (Resistors 454 and 460 are equal in magnitude.) At the same time, the average voltage level at the top of potentiometer 452 is maintained at ground potential, the same potential as at the input to resistor 460. The positive shift in average level at the cathode of tube 450 thus depends on the setting of potentiometer 452. The level increases as the arm of the potentiometer is moved away from the cathode. The feedback circuit also stabilizes the gain of amplifier tube 420, reduces the output impedance presented to the following circuit, and improves the linearity of response.

Cathode follower tube 450 having its grid connected to capacitors 442 and 444 is the source of plate voltage for shunt clamp tubes 466 and 468, and is also the source of the charging voltage for capacitors 470 and 472. These shunt clamp tubes are normally at zero bias, but are cut off by the negative DF sweep gate. When they are cut off, the current from cathode follower tube 450 charges capacitors 470 and 472 through step resistor 476 and series resistors 478 and 480. This forms a positive sweep voltage. The charging potential of these capacitors is kept above D.C. ground potential by the action of crystal clamper 484. The resultant trapezoidal positive-going waveform has a slope dependent upon the cathode potential of tube 450 which is held constant during the time of sweepgate.

The positive waveform is coupled to the grid of cathode follower tube 486, which injects it on the cathode of mixer amplifier tube 488. This tube 488 amplifies the waveform without inverting it, and superimposes the waveform on the quiescent D.C. voltage determined by either of the off-centering potentiometers 490 or 492. The grid of tube 488 is connected through "Centered—Off-Centered" control switch 494 to the off-centering potentiometers. The waveform is next mixed with a fixed amplitude negative going sweep, generated at tube 410B by cathode follower tubes 496 and 498. This method of mixing provides the bipolar sweep required for sweep deflection in any azimuth direction. When conduction tube 410B is cut off by the negative DF gate appearing on its grid (time $T_w$), the negative sweep voltage is generated across charging capacitors 500 and 502. Normally, this sweep voltage would be a linear sawtooth. The cutoff gate appearing on the grid of tube 410B, however, causes a slight step at the start of the sweep which results in the formation of a trapezoidal waveform. The value of step resistor 476 is chosen so that the step created in the positive sweep clamp generator is sufficiently high to exactly cancel the negative step produced in the negative sweep generator. The output of the mixer appearing at the grid of voltage amplifier tube 508 is a sawtooth which starts at time $T_w$ and has a slope representing the amplitude of the sine reference voltage appearing at the plate of tube 438 at time $T_w$. This amplitude will be proportionate to the phase of the sine wave at time $T_w$. Linear response is possible because the positive sweep voltage appearing at the cathode of tube 496 is exactly twice (at its peak) the amplitude of the negative sweep voltage appearing at the cathode of tube 498. The resultant positive or negative sweep voltage is applied to the push-pull output current amplifiers and is used in the off-centering coils 70 to deflect the beam for one sweep interval. Crystal 510 at the grid of negative sweep generator tube 410B maintains the D.C. level at the grid of tube 410B at the value determined by a voltage divider. The voltage divider comprises resistors 514 and 516 connected from ground potential to a −150-volt potential. This D.C. level is critical, since all DF and off-centering circuits are of the direct-coupled type.

The bipolar sawtooth voltage from mixer tube 498 is inverted in amplifier tube 508 and is shifted in level by voltage divider resistors 520 and 522. This modified sawtooth is applied to deflection amplifier tube 424. Current flowing through cathode resistor 530 develops a sawtooth voltage (opposite in polarity from the input) which is fed back to the grid of tube 508 through resistor 532. This voltage is also applied as the driving voltage for the opposing deflection amplifier circuit tubes 536 and 426. The feedback loop fixes the gain of the circuit, in a manner similar to that employed in the amplifier and series clamp circuit discussed above. It improves the linearity of the amplifier and reduces the output impedance presented to the following circuit. The operating point of tube 424 is adjusted by centering potentiometer 490 which is directly coupled through tubes 488, 496, and 508 to the grid of tube 424. The voltage across cathode resistor 530 is set at approximately +5 volts for class A operation of tube 424. The other deflection amplifier circuit, consisting of tubes 536 and 426, is identical in operation to the first. The output is the inverse of the output of tube 424. Current to one of the DF sweep coils increases, whereas current through the sweep coil decreases. The operating point is adjusted to bring the P.P.I. sweep origin to the center of the CRT, after the voltage across resistor 530 has been established. The voltage across resistor 530 is adjusted by "Vert Current Bal" potentiometer 540.

In operation, when the DF stroke switch 75 on the search indicator display unit panel is depressed and no R-F transmission is being received, no strobe is produced. There is, however, a small 30-cycle ripple evident on the range marks, and a slight "spoking" effect on the P.P.I. sweeps. In the absence of DF gates, shunt clamp tubes 467 and 466 are at zero bias, but have sinusoidal plate voltages applied to them from the sine and cosine reference voltage amplifiers. Only a small amount of modulation occurs, since the plates are near ground potential.

Normal DF presentation consists of a strobe at a constant bearing, which appears intermittently at a 30-c.p.s. rate. Between the appearance of each strobe is approximately 22,000 microseconds of normal video, which appears as an arc. The limits of the arc are determined by the angular rotation of the P.P.I. deflection coil. The continually rotating P.P.I. coil thus causes video to appear as a series of fan-shaped areas radiating from the center of the CRT, with the DF strobe recurring at a constant bearing but this bearing, of course, changes with change in direction of the aircraft.

Figure 8:
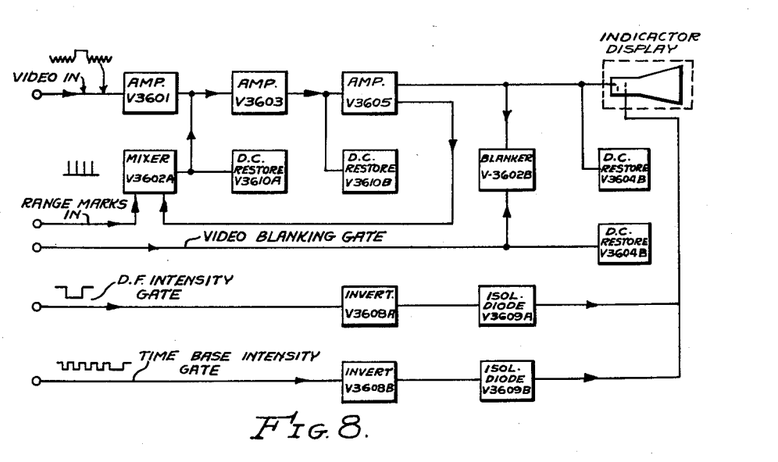
Figure 8 is a block diagram of the video amplifier shown in schematic form in Figure 7.

As indicated in Figs. 7 and 8, the normal functions of this unit are interrupted by DF operation. When the DF strobe switch is depresesd, the P.P.I. intensity gate is turned off in the search central unit 22 (Figs. 1 and 6), the video blanking gate is applied to the cathode of the CRT to cut off video signals, and the DF intensity gate drives the CRT control grid in a positive direction during the time of the DF sweep gate. This produces an intensified DF strobe free from other modulation.

A video blanking gate from the search central unit 22 is applied to the CRT shortly after the DF strobe switch is depressed. This gate has an amplitude of approximately +200 volts and blanks the CRT for 11,000 microseconds. It is applied to the grid of tube V–3602B (Fig. 7) through the network comprising resistors R–3604, R–3608, and tube V–3604A. Blanker tube V–3602B is normally maintained at cutoff by the −100-volt potential on its grid. The grid of tube V–3602B is connected to the junction of resistors R–3608, R–3604, and the plate of clamper tube V–3604A. When the +200-volt blanking gate is applied, it raises the level of such junction to ground potential, where it is held by clamper tube V–3604A. This causes tube V–3602B to conduct, thus raising the cathode of the CRT to a near-ground potential, cutting off the beam current in the CRT. Video is effectively blanked for the period of the gate (11,000 microseconds). This permits intensification of the tube for presentation of the DF strobe mark, without interference from video signals.

The DF intensity gate is applied during the period of generation of the DF sweep in the search central unit 22 (from time $T_w$ to time $T_x$). The DF intensity gate begins 1700 microseconds after the start of the video blanking gate, and is 2000 microseconds long. Tube V-3608B normally conducts, and its cathode and grid are at a potential of −210 volts. The plate of tube V-3608B is at ground potential. The −20-volt intensity gate cuts the tube off, and forms a positive gate on its plate. A portion of this gate is applied through diode tube V-3609B to the grid of the CRT. (The amplitude of this portion of the gate is determined by the setting of "DF Intens" potentiometer R-3629.) The grid voltage of the CRT is raised from approximately −210 volts to the potential required for proper intensification of the DF strobe.

I claim:

1. In a system of the character described, means producing a display representative of the area scanned by an antenna beam, said means incorporating a cathode ray tube having cathode beam intensity control means and cathode beam deflecting means associated therewith which are both normally effective in producing the aforementioned display, means sensitive to the direction of an aircraft and receiving signals broadcast from said aircraft for developing a trigger voltage the time of occurrence of which is representative of the direction of said aircraft, video blanking gate generating means controlled by said trigger voltage for developing and applying a gating voltage to said cathode beam intensity control means, said gating voltage having a relatively long duration, second gating voltage generating means controlled by said trigger voltage for developing a second gating voltage which is of relatively short duration and which commences substantially contemporaneously with the first mentioned gating voltage, third gating voltage generating means controlled by said trigger voltage for developing a third gating voltage which begins substantially contemporaneously with the termination of the second gating voltage and which terminates an appreciable time before the termination of the first mentioned gating voltage, sweep generating means including said cathode beam deflecting means controlled by said third gating voltage for developing cathode beam sweeps for the duration of said third mentioned gating voltage, and means applying said third gating voltage to said cathode beam intensity control means to render the display visible during the duration of said third gating voltage.

2. In a system of the character described, means producing a display representative of the area scanned by an antenna beam, said means incorporating a cathode ray tube having cathode beam deflecting means and cathode beam intensity control means associated therewith, means sensitive to the direction of an aircraft and receiving signals broadcast from said aircraft for developing a trigger voltage the time of occurrence of which is representative of the direction of said aircraft, first gate generating means controlled by said trigger voltage and coupled to said cathode beam intensity control means for blanking the display a relatively long time interval with the gating voltage developed thereby starting substantially contemporaneously with the trigger voltage, second gate generating means incorporating delay means controlled by said trigger voltage for developing a relatively short gating voltage which begins an appreciable time after the beginning of the first gating voltage and which terminates an appreciable time before the termination of the first gating voltage, means coupling said second gating voltage to said cathode beam intensity control means to unblank the display for the duration of said second gating voltage, and sweep generating means including said cathode beam deflecting means controlled by said second gating voltage for developing sweeps during the interval of said second gating voltage.

3. In a system of the character described, means normally producing a display representative of the area scanned by an antenna beam, said means incorporating a cathode ray tube having cathode beam deflecting means and cathode beam intensity control means associated therewith, second means including said cathode beam deflecting means and said cathode beam intensity control means normally ineffective to produce an indication on said cathode ray tube representative of the direction of an object in said area, switch means rendering said first and second mentioned means alternately effective, said second means incorporating means sensitive to the direction of an aircraft and receiving signals broadcast from said aircraft for developing a trigger voltage the time of occurrence of which is representative of the direction of said aircraft, said second means incorporating sweep generating means controlled by said trigger voltage for developing sweeps over said cathode ray beam, said sweep generating means incorporating said cathode beam deflecting means, delay means controlled by said trigger voltage for delaying the operation of said sweep generating means a first predetermined time interval until said cathode beam deflecting means has attained a substantially magnetically stabilized condition, means including said cathode beam intensity control means and controlled by said trigger voltage for blanking the display during said first time interval, and means including said cathode beam intensity control means and controlled by said trigger voltage for blanking said display a second predetermined time interval after operation of said sweep generating means during which time said cathode beam deflecting means is allowed to again reach a magnetically stabilized condition.

References Cited in the file of this patent

UNITED STATES PATENTS

| | | |
|---|---|---|
| 2,528,202 | Wolff | Oct. 31, 1950 |
| 2,582,962 | Burroughs | Jan. 22, 1952 |
| 2,597,895 | Novy | May 27, 1952 |
| 2,632,157 | Jones | Mar. 17, 1953 |
| 2,654,085 | Goldstein | Sept. 29, 1953 |
| 2,691,161 | Allen | Oct. 5, 1954 |